(12) United States Patent
Reese

(10) Patent No.: US 9,272,451 B2
(45) Date of Patent: Mar. 1, 2016

(54) BODY FOR A PASSENGER CAR

(75) Inventor: Eckhard Reese, Apensen (DE)

(73) Assignee: Daimler AG, Stuttgart (DE)

( * ) Notice: Subject to any disclaimer, the term of this patent is extended or adjusted under 35 U.S.C. 154(b) by 428 days.

(21) Appl. No.: 13/640,201

(22) PCT Filed: Mar. 8, 2011

(86) PCT No.: PCT/EP2011/001142
§ 371 (c)(1),
(2), (4) Date: Apr. 12, 2013

(87) PCT Pub. No.: WO2011/124308
PCT Pub. Date: Oct. 13, 2011

(65) Prior Publication Data
US 2013/0193713 A1 Aug. 1, 2013

(30) Foreign Application Priority Data
Apr. 10, 2010 (DE) .......... 10 2010 014 504

(51) Int. Cl.
| | |
|---|---|
| *B29C 45/00* | (2006.01) |
| *B29C 45/14* | (2006.01) |
| *B62D 29/00* | (2006.01) |
| *B29L 31/30* | (2006.01) |

(52) U.S. Cl.
CPC ....... *B29C 45/14467* (2013.01); *B29C 45/1418* (2013.01); *B62D 29/004* (2013.01); *B29C 2045/14967* (2013.01); *B29L 2031/30* (2013.01); *B29L 2031/3002* (2013.01); *B29L 2031/3055* (2013.01)

(58) Field of Classification Search
CPC .............. B29C 45/14467; B29C 45/1418; B29C 2045/14967; B62D 29/004; B29L 2031/30; B29L 2031/3002; B29L 2031/3055
USPC .......... 296/29, 30, 901.01; 29/897.2; 264/250
See application file for complete search history.

(56) References Cited

U.S. PATENT DOCUMENTS

| | | | |
|---|---|---|---|
| 5,794,398 A * | 8/1998 | Kaehler et al. ............... | 52/653.2 |
| 5,940,949 A | 8/1999 | Rink | |
| 6,299,246 B1 * | 10/2001 | Tomka ......................... | 296/205 |
| 2003/0152745 A1 * | 8/2003 | Wagenblast .................. | 428/119 |
| 2004/0232591 A1 | 11/2004 | Dajek et al. | |

FOREIGN PATENT DOCUMENTS

| | | |
|---|---|---|
| CN | 1427758 A | 7/2003 |
| CN | 1777502 A | 5/2006 |
| DE | 100 22 360 A1 | 11/2001 |
| WO | WO 2004/091886 A1 | 10/2004 |
| WO | WO 2005/042182 A1 | 5/2005 |
| WO | WO 2007/038912 A1 | 4/2007 |

OTHER PUBLICATIONS

English-language translation of Chinese Office Action issued in Chinese Patent Application No. 201180018344.X (Seven (7) pages).
Chinese Office Action dated Nov. 27, 2014 with English translation (14 pages).
Corresponding International Search Report with English Translation dated Jun. 10, 2011 (seven (7) pages).
Form PCT/ISA/237 (six (6) pages).

\* cited by examiner

*Primary Examiner* — Joseph D Pape
(74) *Attorney, Agent, or Firm* — Crowell & Moring LLP

(57) ABSTRACT

A method for producing a body of a passenger car is provided. A plurality of body components are connected to each other, the body components are provided at least in part with a plastic. The body is produced in a combined internal high pressure forming and injection molding process.

13 Claims, 3 Drawing Sheets

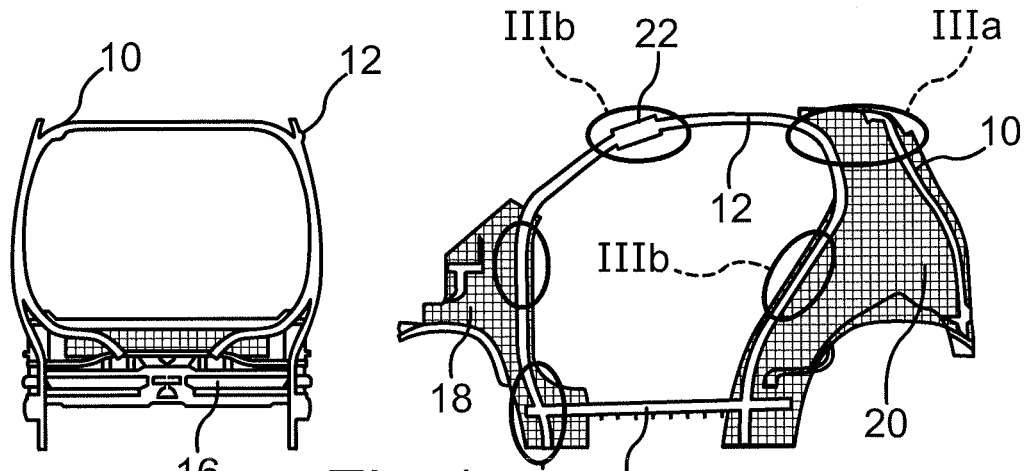
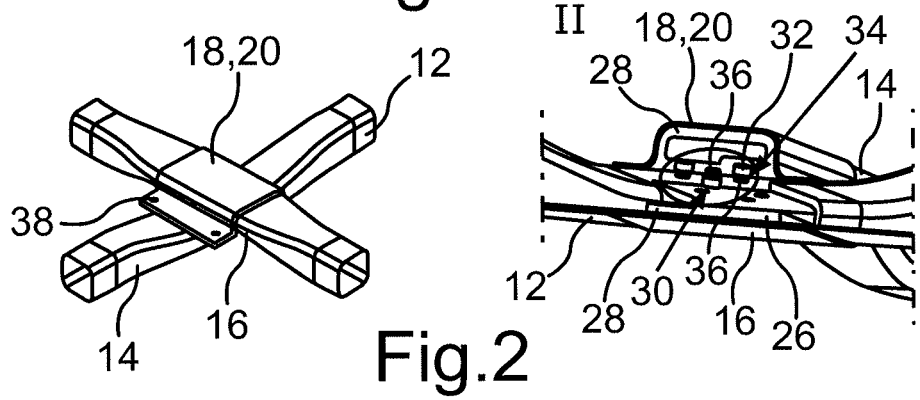
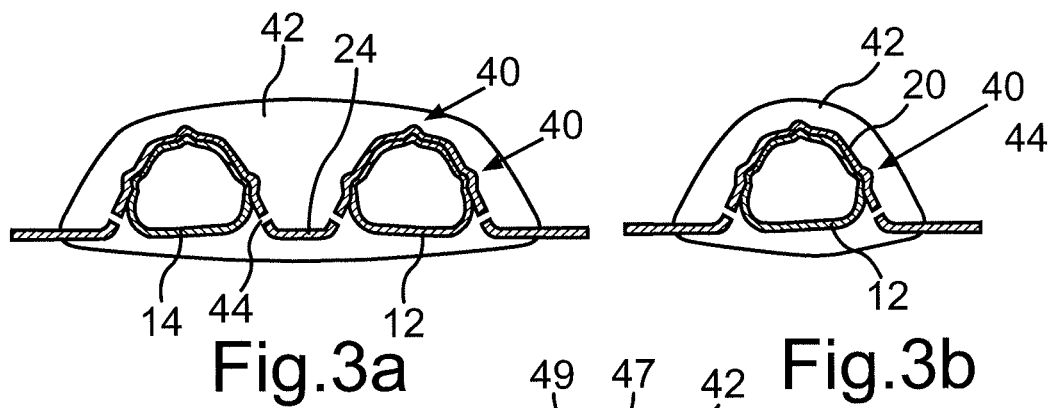
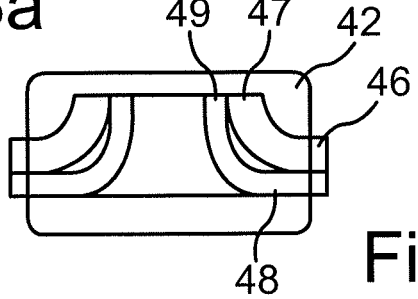

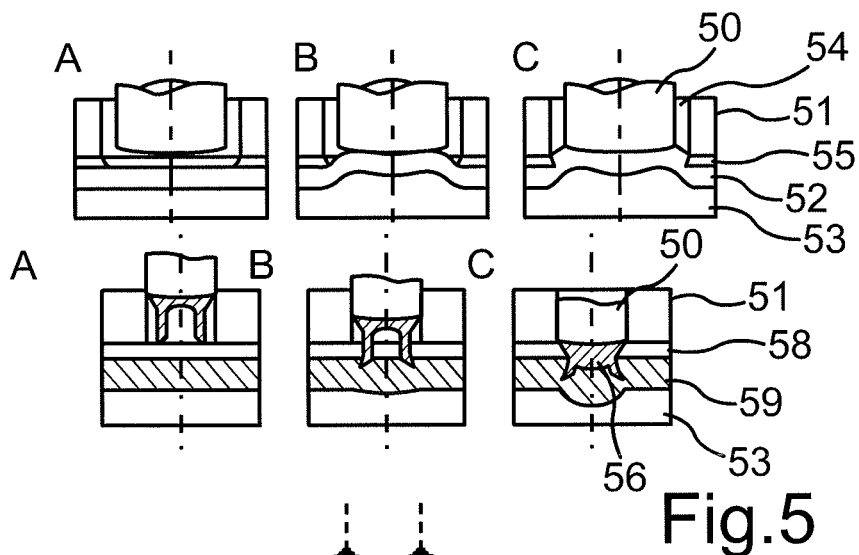
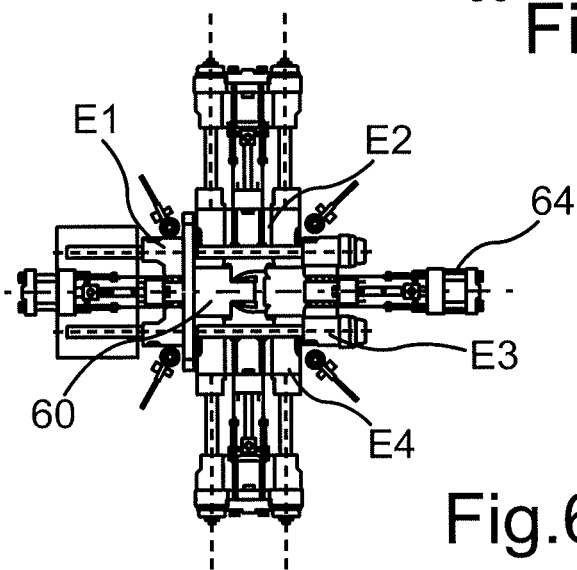
Fig.5
Fig.6
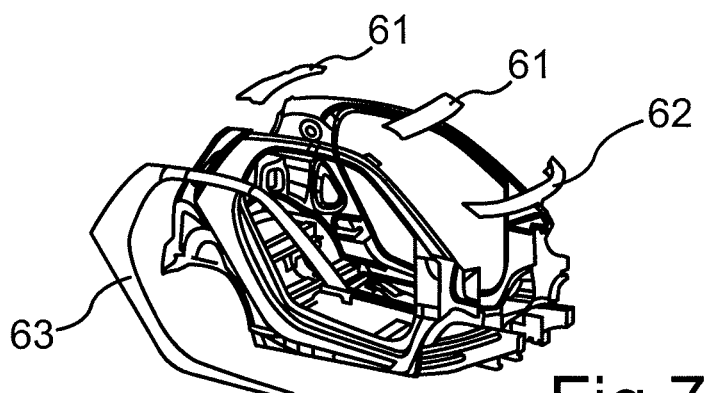
Fig.7

BODY FOR A PASSENGER CAR

BACKGROUND AND SUMMARY OF THE INVENTION

Exemplary embodiments of the present invention relate to a method for producing a body of a passenger car, such a body of a passenger car, and an installation for producing such a body of a passenger car.

In series production of passenger cars, a plurality of body components are usually connected to each other, for example, through welding or adhesive bonding in order to produce the vehicle structure. It is further known that individual body components of the body can be provided with a plastic in order to configure them as hybrid components. Such hybrid components are used, for example, in instrument supports, door supports or other support components.

Existing passenger car bodies usually consist of a plurality of individual parts connected to each other by joining techniques requiring great resources and expenditure. In order to achieve sufficient precision in the joining-together of the individual body components, a plurality of individual operations are required on very expensive assembly lines. The individual body components that usually consist of a steel or aluminum alloy are formed into the desired geometry in presses or on shell construction lines and put together to form the body in further work steps by welding robots. In particular, with aluminum body components other joining techniques such as clinch-bonding or similar are also used. Optionally the body components are also put together in differential construction—thus with different joining technologies—for example if individual body parts consist of a fiber-reinforced plastic. This leads to many individual and expensive steps with high costs and imprecision. A further problem is that it has only been possible up to now to add components, units, cables or similar to the body or integrate them therein using extremely great resources.

Exemplary embodiments of the present invention are directed to a method, a body and an installation of the type mentioned above, by means of which a significantly simplified production and assembly process of the body is achieved.

In order to provide a method, by means of which the body of the passenger car can be created in a significantly simplified production and assembly method, in accordance with the present invention the body is produced in a combined internal high pressure forming and injection molding process. In other words, in accordance with exemplary embodiments of the present invention all or at least a large proportion of the vehicle body is produced in a correspondingly combined internal high pressure forming and injection molding installation. This takes place, for example, in that corresponding body components are connected to each other or fitted through internal high pressure forming and/or injection molding of plastic. It is possible, for example, to connect individual body components to each other in a shape-locking way, for example through corresponding internal high pressure forming methods such as hydro-clinching or hydro-punch-riveting. It is likewise possible to connect the body components to each other through the intermediary of hybrid connecting nodes using plastic. Additionally, the plastic can also be used to mold corresponding reinforcing structures at least partially on the respective body components. For example, a weight reduction can be produced, as the wall thicknesses of the body components can also be correspondingly reduced. In addition component and/or function regions for components, units or parts can be integrated in the plastic.

As a result there is a significant simplification of the process for producing the passenger car body, as not only the body components can be joined together in one stage but also a plurality of function regions or similar, required up to now and arranged separately on the body, can now be an integral constituent part of the body.

A further advantage lies in the drastic reduction in the number of individual components, from which the vehicle body is joined together. In addition there is a quality improvement through fewer work steps in comparison with other joining methods, which is reflected in lower production tolerances and lower repetition tolerances. A further advantage is that a body with high rigidity, strength and structural integrity, for example in case of accident-related force impact, can be realized through point-by-point reinforcement of the structural components with the plastic. Further advantages are the high ecological sustainability of this design and economy even with small numbers. In addition, new types of unusual design concepts can be provided through the present method extremely rapidly and cost-effectively. The very high function integration thereby reduces also the subsequent production costs and times. In addition there are lower industrialization costs for the infrastructure and buildings and lower investment costs, for example through the omission of cathodic immersion painting and other installations, for example painting installations.

The advantages described above in connection with the method according to the invention apply in the same way for a body and an installation.

BRIEF DESCRIPTION OF THE DRAWING FIGURES

Further advantages, features and details of the invention ensue from the following description of preferred embodiments and by reference to the drawings, in which:

FIG. 1 shows a schematic front view and a schematic side view of a body of a passenger car with a plurality of body components connected to each other, which are at least partially provided with plastic, wherein the body is produced in a combined internal high pressure forming and injection molding process;

FIG. 2 shows a perspective view and a perspective sectional view of two body components formed as internal high pressure formed tubular profiles which are arranged in a cross formation and are connected to each other via a hybrid connecting node;

FIGS. 3a, 3b show a respective sectional view of a double hybrid connecting node for connecting two body components formed as internal high pressure formed tubular profiles with a panel, wherein plastic over-molding is provided, and also an individual hybrid connecting node between an internal high pressure formed tubular profile with a panel which is also over-molded with plastic;

FIG. 4 shows a connection of two body components formed as panels, of which the respective collars go into a plug-in connection with each other and are surrounded by a plastic over-molding;

FIG. 5 shows respective schematic sectional views of the sequence of different method steps at the top during hydro-clinching and at the bottom during hydro-punch-riveting for joining different body components;

Figure 8:
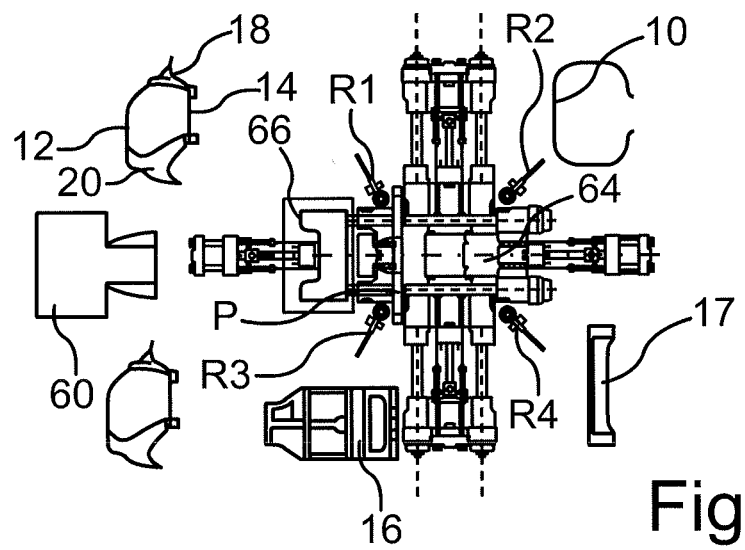
Figure 9:
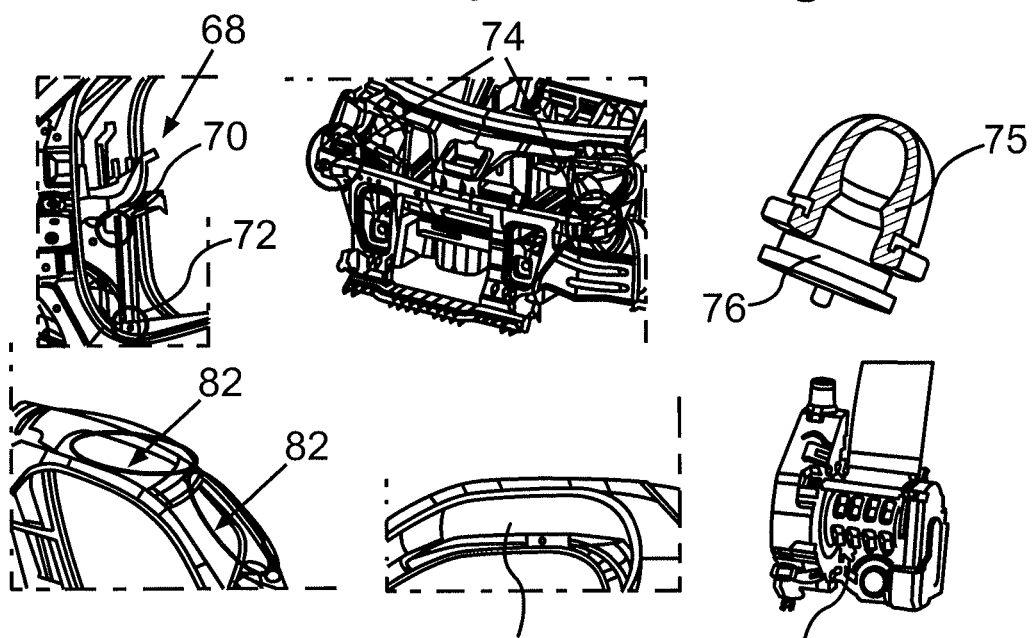
Figure 10:
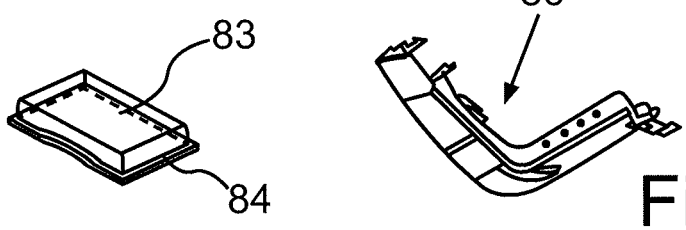

FIG. 6 a schematic top view of an installation for producing the body of the passenger car in an internal high pressure forming-injection molding machine;

FIG. 7 a perspective exploded view of a body of a passenger car;

FIG. 8 a schematic top view of the installation according to FIG. 6, wherein an equipping configuration of the internal high pressure forming-injection molding machine can be seen;

FIG. 9 shows on the top left-hand side a cut-out perspective view of the body of the passenger car in the region of a crossbeam for instruments; in the middle at the top a cut-out perspective view of the front structure of the passenger car in the region of respective receiving areas for the front end support; on the top right-hand side a perspective sectional view of a rear light snap connection; on the bottom right-hand side a perspective view of a seatbelt retractor with housing; in the middle at the bottom a cut-out perspective view of a roof paneling of the passenger car body and on the bottom left-hand side a cut-out perspective view of the passenger car body with receiving areas of the interior paneling via snap connections; and FIG. 10 shows a perspective view of a flat cell battery housing and a perspective view of a plastic structural part with receiving areas for cabling.

DETAILED DESCRIPTION

FIG. 1 shows a schematic front view and side view of a body for a passenger car. Although exemplary embodiments of the present invention are described below in connection with a two-seat vehicle in one-box form, the present invention is equally applicable to other types of passenger car bodies. FIG. 1 illustrates the following body components: a rear frame profile 10, a respective side frame profile 12 and a respective side skirt profile 14. These body components 10, 12, 14 are respectively designed as internal high pressure forming-injection molding components. Also illustrated is a bottom panel over-molded with plastic, a front side structural panel 18 over-molded with plastic, a respective rear side structural panel 20 over-molded with plastic and a gusset plate 22 formed as a roof frame receiving element. The body components 10 to 22 can also essentially be tubular or hollow profiles or also flat elements such as panels. The body components 10 to 22 can consist of metal base components that are over-molded with plastic, in particular fiber-reinforced plastic. Instead of the metal formation of the base components, these components can be produced from a preferably consolidated fiber-reinforced plastic material, in particular a carbon-fiber-reinforced plastic material. Regarding the whole body, mixed forms are also conceivable, that is to say some of the body components 10 to 22 contain a metal base component and others a fiber-reinforced-plastic base component, according to requirements, in particular in relation to the mechanical properties such as rigidity and strength.

The different joining techniques that can be used in connection with the present passenger car body will be explained below by reference to FIGS. 2 to 5.

FIG. 2 shows a schematic perspective view and a perspective sectional view of a hybrid connecting node, by means of which, for example, according to the detail II in FIG. 1 the body component 12 in the form of the side frame profile is connected to the body component 14 in the form of the side skirt profile.

It can be seen from the sectional view of FIG. 2 that an inlay element 26, 28 is provided within the respective hollow profile of the body components 12 and 14. The connection of the two body components 12, 14 takes place through a plurality of shape-locking hydro-clinching connections 30. These are created by passage openings 32 or blind holes 34 being incorporated in the inlay elements 26, 28, into which passage openings 32 or blind holes 34 the respectively corresponding wall regions 36 of the corresponding body component 12, 14 are pressed by internal high pressure forming impact. In the region of the respective wall region 36 of the corresponding body component 12, 14 the other body component 12, 14 also comprises a passage opening. As a result, at least one shape-locking hydro-clinching connection 30 is created in the region of the hybrid connecting node. In the two body components 12, 14 formed as profile components—the side frame profile and the side skirt profile—panel elements are provided in the present case at the top side and the bottom side adapted in cross-section to the body components 12, 14. In the present case it is thereby a question of the two side structural panels 18 or 20 and the bottom panel 16. These are likewise connected to each other by means of hydro-clinching connections 38. Not shown in the present case is plastic ribbing in the region of the hybrid connecting node, which can be used for strengthening and function integration. It should be noted that such a hybrid connecting node can optionally also be formed without an inlay element 26, 28. In particular a plastic cross ribbing that is molded around the hybrid connecting node is used.

FIGS. 3a and 3b show further hybrid connecting nodes according to the respective details IIIa or IIIb in the side view of FIG. 1. It can be seen, for example, from FIG. 3a in a schematic sectional view that the two body components 10, 12, thus the rear frame profile and the side frame profile, are joined via a double hybrid connecting node. The two body components 10, 12 are connected to each other via a deep drawn panel 24. The deep drawn panel 24 likewise constituting a body component is connected to the body components 10, 12 via respective hydro-clinching connections 40, which are produced in the known way through internal high pressure forming. The whole double hybrid connecting node is over-molded with plastic 42, which is formed as plastic ribbing. Within the deep drawn panel 24 there are a plurality of through-injection points 44, through which a shape-locking connection between the plastic 42 and the deep drawn panel 24 or the body components 10 and 12 results.

FIG. 3b shows in a sectional view of substantially the same configuration between the deep drawn panel there in the form of the side structural panel 20 and the corresponding body component 12, the side frame profile, which are connected via a plurality of hybrid connections 40. Likewise, in turn, through-injection points 44 are provided. FIG. 3b thus shows a hybrid connecting node, in which merely a tubular element is joined with a panel and over-molded with plastic 42.

As can be seen from FIG. 4, the joining of two body components in the form of panels 46, 68 can also be realized via a connection, in which a collar 47 of the panel 46 is connected with a collar 49 of the panel 48 engaging in each other in a shape-locking way. In this type of connection the collars 47 and 49 are incorporated into the two panels to be joined, which collars 47 and 49 are adapted to each other in their dimensions. These collars 47, 49 are pushed into each other and over-molded with plastic 42.

FIG. 5 shows in respective schematic sectional views two further shape-locking internal high pressure forming-joining methods that can be used alternatively or additionally to the abovementioned methods or connections. It is hereby a matter of hydro-clinching and hydro-punch-riveting. In the top three illustrations of FIG. 5, a die 50 and a hold-down element 51 are illustrated, which are arranged on the pressure-remote side of a body component 52 configured as a fluid plate. On the pressure side of the body component 52 a high pressure fluid 53 thereby presses so that a wall region of the body component 52 is pressed into the corresponding opening of the hold-down element 51 and thus also into a corresponding opening 54 of a further body component 55 to be connected to the body component 52, and indeed against the force of the die 50. Through the hydro-clinching, therefore, profiles can be joined to profiles, or profiles joined to panels, or panels joined to panels.

Similarly, the bottom illustrations of FIG. 5 show the hydro-punch-riveting, wherein a hydro-punch rivet 56 is incorporated by means of a die 50 into two body components 58, 59 to be connected and indeed against the pressure of the hydro-fluid 53 that acts on the side facing away from the hydro-punch rivet 56. The hold-down element 51 ensures secure bearing of the two body components 58, 59 against each other. In this way profiles can be joined to profiles, profiles joined to panels, or panels joined to panels through hydro-punch-riveting.

In addition shape-locking joining techniques are possible that are optionally reinforced with plastic over-molding. Material-locking joining techniques can also be used. When using an aluminum internal high pressure formed tube and/or panel, polyamide over-molding on a PA-based primer coating of the aluminum tubular element and/or panel can be used for example, which facilitates the material-locking connection between the aluminum tubular element and the over-molded ribbing.

FIG. 6 shows in a schematic top view an installation for producing such a body of a passenger car that comprises, as described in more detail below, respective units for internal high pressure forming and injection molding, by means of which the body can be produced in a combined internal high pressure forming and injection molding process. The body is to be produced in a so-called "one-shot" process. Essentially the installation comprises four units E1, E2, E3, E4, wherein the units E1, E2 and E4 are designed to be movable in the present case while unit E3 is stationary.

The movable unit E1 is used to equip a mould core 60. The mould core 60 is moved with this unit E1 out of the interior of the installation or machine and can be equipped outside. In order, for example, to be able to realize the large-scale over-molding of the side walls and the vehicle bottom on a horizontal machine configuration, the body is rotated by 90° about its transverse axis. In order to ensure that the individual body components 10, 12, 14, 16, 18, 20 can be arranged around the mould core 60 and that the joined-together body still remains de-moldable—as illustrated in FIG. 7—roof frame profiles 61 and a crossbeam 62 are connected to the body in a process after the combined internal high pressure forming and injection molding process. Paneling elements 63 are also—as shown in FIG. 7—mounted downstream.

The units E2 and E4 are two-plate locking units with integrated plasticizing units 64. The omission of the two-plate locking units is optionally possible through integration into the internal high pressure forming and injection mould. The units E2 and E4 are—as mentioned above—designed to be movable in order to facilitate the final de-moldability of the body. In contrast, the unit E3 is designed to be stationary in order to limit the complexity of the installation or the internal high pressure forming—injection molding machine. FIG. 6 also shows a transport deposit 66, on which the body can be deposited after final forming above the installation. This can be carried out with a portal crane.

FIG. 8 shows in a schematic top view similar to FIG. 6 the installation for producing the body. In particular four robots R1 to R4 can thereby be seen as well as a portal crane P, by means of which the mould core 60 is equipped.

According to the equipping concept of the installation shown in FIG. 8 the two structural panels 18, 20 and the two roof frame panels are laid—positioned relative to each other with the previously formed side frame profiles 12—from both sides on the mould core 60. The robots R1 and R3 assume this task. The robot R2 equips the bottom die of the mould core 60 with the preformed rear frame tubular element or rear frame profile 10. The robot R4 equips the die, which is connected immovably to the unit E3 with a body component 17 formed as a front end panel. The portal crane P equips the front side of the mould core 60 with the bottom panel 16.

The portal crane P assumes, besides the function of equipping, also the task of conveying the completely joined internal high pressure formed and injection molded body to the transport deposit 66 located above the installation or machine, from where the body is then transported further to the downstream processes.

The processes provided before and after the internal high pressure forming and injection molding processes can also be realized physically beside the present installation. The preparation of parts for receipt by robots and by the portal crane P is carried out between the upstream and downstream processes and the present installation. A simple transporting of the components to and from the installation is thus facilitated. A special area for mould change is also reserved in the upstream and downstream processes in the region of the installation. This mould change can take place for example through the portal crane P.

The method for producing the body of the passenger car is carried out as follows.

Body components—for example the components 10 to 20—which form the basis for the body structure are formed as semi-finished elements and laid in the mould core 60 of the installation. The final forming of these semi-finished elements takes place through the combined internal high pressure forming and injection molding process in the mould of the injection molding machine. This method is an internal high pressure forming method that is combined with, for example, a simultaneous over-molding of the body with the plastic 42. In particular fiber-reinforced plastics, such as PA or PEEK thermo-plastics. However, duro-plastics can be used. The fluid pressure of the plastic melt thereby also lying externally against the respective tubular profile of the body component 10 can thereby function as a die substitute—besides conventional dies. In other words the plastic melt and the high pressure fluid can be used for the molding of the respective body components 10 to 20.

The previously formed semi-finished elements of the body components 10 to 20 are used on both body sides, in the region of the bottom and at the rear of the body. These are arranged in the previously described manner around the mould core 60. The individual body components 10 to 20 that have a corresponding hollow profile can, for example, be foamed locally with a corresponding plastic at mechanically highly stressed points such as, for example, the hinge connection of the doors and the connection region of the roof frame receiving gusset plate. For example, PUR can be used as such a plastic for local filling of the respective hollow profile of the corresponding body component 10 to 20. This foaming results in an increase in rigidity and the properties in case of accident-related force impact. Such local foaming is conceivable for example in the region of detail IIIb in FIG. 1, thus in the region of the roof frame receiving gusset plate.

The structural panels—for example the side structural panel 18 and the side structural panel 20—are inserted already in their almost complete form into the mould or arranged in the mould core 60. These structural panels 18 and 20 are over-molded in the internal high pressure forming and injection molding machine with fiber-reinforced plastic.

Through this reinforcement the wall thicknesses of the structural panels 18, 20 can be reduced, whereby further weight-saving potential is exhausted. Such structural panels 18, 20 are used, for example, as a bottom structure, in the front end region and on the side structural regions. In order to maintain the principle of the Faraday cage, metal structures, also metallic fiber structures and/or conductive fibers for example of carbon or similar can also be integrated or injected into the body. The production of the body is thereby realized according to the "one-shot" principle. This means that the whole, or a large proportion of, the body is produced in one mould. In order to join the body, the methods known from the polymer hybrid technology (in-mould assembly methods) and internal high pressure forming are used.

Possible function integration will now be explained in connection with FIGS. 9 and 10.

It is initially possible for components, lines or similar to be integrated at least in regions in the plastic 42. It is, for example, possible to integrate a conductive material such as, control lines and energy supply lines into the plastic 42 formed as structural polymer material or to over-mould them directly with plastic 42. In addition, for example, optical fibers can be used for lighting. Both an indirect and a direct line feeding are thereby possible.

An alternative function integration is shown in FIG. 9. The top left illustration shows in a cut-out the body in the region of an instrument crossbeam 68 in a perspective side view. The body thereby comprises a plurality of function regions 70, 72 in the form of connection surfaces or positioning points or similar, via which the instrument crossbeam 68 can be fixed to or positioned on the body. The function regions 70, 72 are created from the plastic 42.

The top middle illustration of FIG. 9 shows the body in the front region with corresponding function regions 74 that serve as connecting surfaces, positioning elements or similar for the front end support. These function regions 74 are also integrated into the plastic 42.

A further such function integration is shown in the top right illustration of FIG. 9, in which a snap connection for a rear light is shown in a partially sectional perspective view. One of the two snap connection parts 75, 76 can thereby be formed on sides of the body as a function region that is integrated into the plastic 42.

According to the bottom right illustration of FIG. 9, which shows a seatbelt retractor with housing, a corresponding housing part 78 can also be made of plastic 42 that is assigned to the body. In other words it is thus also possible to provide a housing part 78 of such a component on sides of the body provided with plastic 42.

The bottom middle illustration shows a cut-out perspective view of the body, wherein receiving areas on the body side for a roof liner or a roof paneling 80 can also be formed as function regions. These function regions for fixing the roof paneling 80 can be formed, for example, in the manner of the snap connection according to the top right illustration, whereby one snap connection part 74 is provided on the side of the roof paneling 80 and the other snap connection part 75 in turn on the side of the body—formed through the plastic 42 thereof.

Finally the bottom left illustration of FIG. 9 shows the body, in a cut-out and perspective view, wherein interior paneling 82 can be fixed in the region of the door column or the door frame likewise with such snap connections.

Through the design possibilities that arise through the production of the body in the internal high pressure forming and injection molding process, it is possible to integrate energy-efficient drive technologies, to save on function components and to consider the function directly in the body geometry.

FIG. 10 thus shows on the right a flat cell battery housing with two housing halves 83, 84 in a perspective view, wherein, for example, the function of one housing half 84 can be assumed directly by the plastic 42 or the body geometry. The remaining housing components of the battery can be connected to the body via a quick clamping system for rapid and automatic battery exchange.

Finally the right illustration of FIG. 10 shows a further field of application in the use of wheel hub motors. The cabling can thus be received directly by the body. A structural component or body component 86 that assumes the cabling through overmolding is shown on the right in FIG. 10.

As a further variant the integration of inner space temperature control functions is possible. Area-integrated temperature control systems can be integrated into the structure or the plastic 42. These temperature control systems (power-conducting/heat conducting over-molded structures) can have different applications, for example, as floor heating, front panel heating, rear panel heating or similar.

It is also possible to lay conductive fiber structures and/or textile sensor systems in the mould and over-mould them with plastic 42. In case of loads such as movements of the body they lead to a change of the line resistance or to a capacitance change. This change is detected and recorded. This results in findings relating to the operating strength or having regard to harmful effects.

All in all it can thus be seen that in the present invention a method, a body and an installation are created, by means of which a body can be produced from a plurality of body components 10 to 20 that is provided with a plastic 42 in a combined internal high pressure forming and injection molding method.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for producing a body of a passenger car, the method comprising:
    connecting a plurality of body components to each other by
        arranging the plurality of body components in a mold core; and
        subjecting the plurality of body components to a combined internal high pressure forming and injection molding process while the plurality of body components are arranged in the mold core,
    wherein the plurality of body components include at least some plastic prior to subjecting the plurality of components to the combined internal high pressure forming and injection molding process.

2. The method according to claim 1, wherein respective body components are connected to each other in a shape-locking way by internal high pressure forming.

3. The method according to claim 1, wherein respective body components are connected to each other by the plastic.

4. The method according to claim 1, wherein respective body components are preformed before the internal high pressure forming and injection molding process.

5. The method according to claim 1, wherein at least one of the following is integrated into the plastic:
- one of the plurality of components,
- a function region for one of the plurality of components, wherein the function region is a connection surface, positioning point, or a snap connection part,
- a part of one of the plurality of components, or
- a unit of one of the plurality of components.

6. An installation for producing a body of a passenger car, by means of which a plurality of body components which are provided at least partially with a plastic can be connected to each other, the installation comprising:
- respective units for internal high pressure forming and injection molding, by means of which the body can be produced in a combined internal high pressure forming and injection molding process,
- wherein one of the respective units is a mold core in which the plurality of body components are arranged while the plurality of body components are subjected to the combined internal high pressure forming and injection molding process.

7. The method according to claim 1, wherein the internal high pressure forming and injection molding are performed simultaneously.

8. The method according to claim 1, wherein the plurality of body components are injection molded with fiber-reinforced plastic.

9. The method according to claim 1, wherein an entirety of the body is formed in one mold.

10. The installation according to claim 6, wherein the respective units are arranged so that the internal high pressure forming and injection molding are performed simultaneously.

11. The installation according to claim 6, wherein the plurality of body components are injection molded with fiber-reinforced plastic.

12. The installation according to claim 6, wherein an entirety of the body is formed in one mold.

13. The installation according to claim 6, wherein two of the respective units are plate locking units with integrated plasticizing units.

* * * * *